United States Patent
Onggosanusi et al.

(10) Patent No.: US 9,048,910 B2
(45) Date of Patent: *Jun. 2, 2015

(54) DOWNLINK 8 TX CODEBOOK SUB-SAMPLING FOR CSI FEEDBACK

(71) Applicant: TEXAS INSTRUMENTS INCORPORATED, Dallas, TX (US)

(72) Inventors: Eko N. Onggosanusi, Allen, TX (US); Runhua Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,177

(22) Filed: Apr. 8, 2014

(65) Prior Publication Data

US 2014/0219218 A1  Aug. 7, 2014

Related U.S. Application Data

(63) Continuation of application No. 13/224,764, filed on Sep. 2, 2011, now Pat. No. 8,693,421.

(60) Provisional application No. 61/379,525, filed on Sep. 2, 2010, provisional application No. 61/384,925, filed on Sep. 21, 2010, provisional application No. 61/385,671, filed on Sep. 23, 2010.

(51) Int. Cl.
*H04B 7/06* (2006.01)
*H04B 7/04* (2006.01)
*H04W 72/04* (2009.01)
*H04L 1/00* (2006.01)
*H04L 5/00* (2006.01)
*H04L 5/14* (2006.01)
*H04L 25/03* (2006.01)

(52) U.S. Cl.
CPC ............ *H04B 7/0626* (2013.01); *H04L 1/0026* (2013.01); *H04L 1/0031* (2013.01); *H04L 5/0023* (2013.01); *H04L 5/0057* (2013.01); *H04L 5/0091* (2013.01); *H04L 5/1469* (2013.01); *H04L 25/03898* (2013.01); *H04B 7/0456* (2013.01); *H04W 72/0413* (2013.01); *H04B 7/0478* (2013.01)

(58) Field of Classification Search
None
See application file for complete search history.

(56) References Cited

U.S. PATENT DOCUMENTS

| 8,625,450 | B2 | 1/2014 | Lunttila et al. | |
|---|---|---|---|---|
| 8,693,421 | B2* | 4/2014 | Onggosanusi et al. | 370/329 |
| 8,811,520 | B2 | 8/2014 | Kim et al. | |
| 2009/0286482 | A1 | 11/2009 | Gorokhov et al. | |
| 2011/0194638 | A1 | 8/2011 | Erell et al. | |
| 2011/0249578 | A1 | 10/2011 | Nayeb Nazar et al. | |

(Continued)

OTHER PUBLICATIONS

3GPP TS 36.213 version 9.2.0 (Jun. 2010) entitled "3rd Generation Partnership Project; Technical Specification Group Radio Access Network; Evolved Universal Terrestrial Radio Access (E-UTRA); Physical Layer Procedures (Release 9)".

(Continued)

*Primary Examiner* — Otis L Thompson, Jr.
(74) *Attorney, Agent, or Firm* — Ronald O. Neerings; Frank D. Cimino

(57) ABSTRACT

This invention is codebook sub-sampling of the reporting of RI, CQI, W1 and W2. If CSI mode 1 is selected RI and W1 are jointly encoded using codebook sub-sampling in report 1. If CSI mode 2 is selected W1 and W2 are jointly encoded using codebook sub-sampling in report 2.

23 Claims, 3 Drawing Sheets

(56) References Cited

U.S. PATENT DOCUMENTS

| | | |
|---|---|---|
| 2011/0249637 A1 | 10/2011 | Hammarwall et al. |
| 2011/0268204 A1 | 11/2011 | Choi et al. |
| 2012/0003945 A1 | 1/2012 | Liu et al. |
| 2012/0020288 A1 | 1/2012 | Liu et al. |
| 2012/0069917 A1 | 3/2012 | Liu et al. |
| 2012/0076023 A1 | 3/2012 | Ko et al. |
| 2012/0087254 A1 | 4/2012 | Yin et al. |
| 2013/0094368 A1 | 4/2013 | Nogami et al. |
| 2013/0195035 A1 | 8/2013 | Taoka et al. |
| 2014/0219219 A1* | 8/2014 | Onggosanusi et al. ....... 370/329 |

OTHER PUBLICATIONS

3GPP TS 36.213 version 10.0.0 (Dec. 2010) entitled "3rd Generation Partnership Project; Technical Specification Group Radio Access Network; Evolved Universal Terrestrial Radio Access (E-UTRA); Physical Layer Procedures (Release 10)".

ZTE, "Considerations on signaling for Two-component Feedback", 3GPP TSG-RAN WG1 Meeting #60bis (sic—should be #61bis), Dresden, Germany, Jun. 28-Jul. 2, 2010.

Nokia Siemens Networks, Nokia, "UL CSI feedback channel design and performance", 3GPP TSG-RAN WG1 Meeting #61bis, Dresden, Germany, Jun. 28-Jul. 2, 2010.

Ericsson, ST-Ericsson, "CSI Feedback Signaling Feedback", 3GPP TSGRAN WG1 Meeting #61bis, Dresden, Germany, Jun. 28-Jul. 2, 2010.

Texas Instruments, "Extending Rel.8/9 CSI Feedback Schemes for Rel. 10", 3GPP TSG-RAN WG1 Meeting #61bis, Dresden, Germany, Jun. 28-Jul. 2, 2010.

Texas Instruments, "Progressing on CSI Feedback for Rel. 10 Downlink MIMO", 3GPP TSG-RAN WG1 Meeting #62, Madrid, Spain, Aug. 23-27, 2010.

NEC Group, "Discussions on Rel-10 PUCCH Modes", GPP TSG-RAN WG1 Meeting #62bis, Xian, China, Oct. 11-15, 2010.

NTT Docomo, "CSI Feedback Signaling on PUCCH for LTEAdvanced", GPP TSG-RAN WG1 Meeting #62bis, Xian, China, Oct. 11-15, 2010.

Nokia, Nokia Siemens Networks, "Detailed PUCCH CSI feedback signaling design", GPP TSG-RAN WG1 Meeting #62bis, Xian, China, Oct. 11-15, 2010.

Motorola, "Remaining details of CSI feedback on PUCCH and PUSCH", GPP TSG-RAN WG1 Meeting #62bis, Xian, China, Oct. 11-15, 2010.

LG Electronics, "Remaining Details on PUCCH Reporting Modes", GPP TSG-RAN WG1 Meeting #62bis, Xian, China, Oct. 11-15, 2010.

Motorola, "CSI Reporting Modes and Codebook Sub-sampling on PUCCH", 3GPP TSG-RAN1 Meeting #63, Jacksonville, FL, Nov. 15-19, 2010.

* cited by examiner

DOWNLINK 8 TX CODEBOOK SUB-SAMPLING FOR CSI FEEDBACK

CLAIM OF PRIORITY

This application is a Continuation of application Ser. No. 13/224,764 filed Sep. 22, 2011. which claims priority under 35 U.S.C. 119(e)(1) to U.S. Provisional Application No. 61/379,525 filed Sep. 2, 2010, U.S. Provisional Application No. 61/384,925 filed Sep. 21, 2010 and U.S. Provisional Application No. 61/385,671 filed Sep. 23, 2010.

TECHNICAL FIELD OF THE INVENTION

The technical field of this invention is wireless communication such as wireless telephony.

BACKGROUND OF THE INVENTION

This invention deals with the problem of signaling channel state information (CSI) between a user equipment (UE) and a base station (eNB).

SUMMARY OF THE INVENTION

This invention is codebook sub-sampling of the reporting of Rank Indicator (RI), Channel Quality Indicator (CQI), first precoding matrix (W1) and second precoding matrix (W2). If CSI mode 1 is selected RI and 1 are jointly encoded using codebook sub-sampling in report 1. If CSI mode 2 is selected W1 and W1 are jointly encoded using codebook sub-sampling in report 2.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
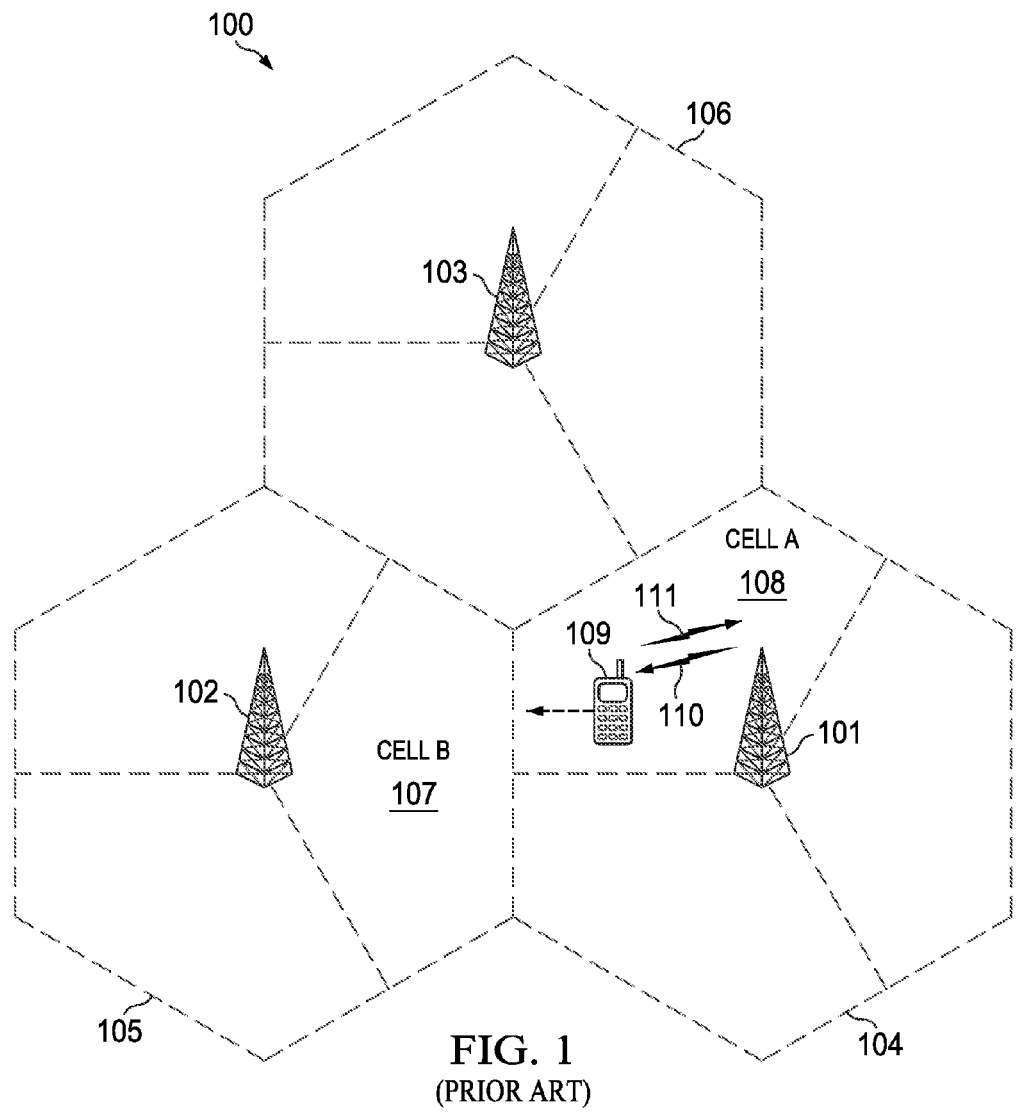
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CST) from the SRS transmission.

Figure 2:
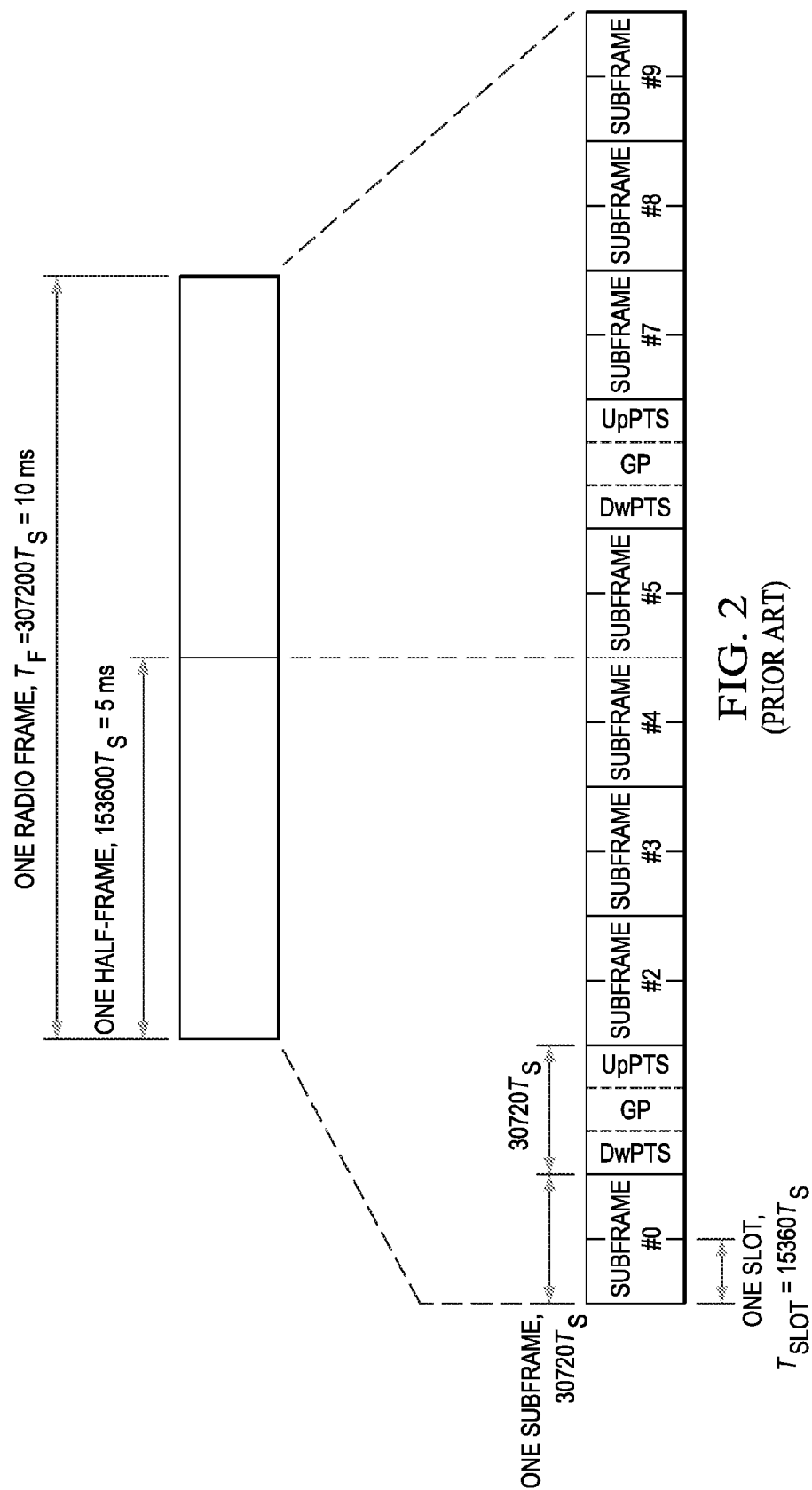
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different sub-frames are allocated for downlink (DL) or uplink (UL) transmissions. Table 1 shows applicable DL/UL subframe allocations. D refers to a downlink sub-frame, U refers to an uplink sub-frame, S refers to a special sub-frame for switching between downlink to uplink.

TABLE 1

| Configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

CSI (channel state information) feedback from UE to eNB consists of rank indicator (RI), precoding matrix indicator (PMI) and channel quality indicator (CQI). RI denotes the number of layers in data transmission recommended by the UE. PMI is the index to the recommended precoding matrix for data transmission, derived from a codebook. CQI is the channel quality when the reported RI/PMI are used for data transmission.

The 8 TX codebook for Rel. 10 downlink (DL) MIMO was adopted in the applicable standard for 8 antenna ports system. For 8 TX each precoding matrix is a multiplication of two component matrices denoted by W=W1*W2. The component codebook for W1 and W2 are denoted respectively C 1 and C2. For CSI feedback, both W1 and W2 need to be reported. Because Physical Uplink Shared CHannel (PUCCH) payload is limited (maximum 11-bits), not all precoding matrices in the C1 and C2 codebook can be used in PUCCH feedback. Following the agreement on CSI reporting modes for PUCCH, the possibility of applying codebook sub-sampling needs to be investigated. This document outlines some possible codebook sub-sampling mechanisms in relation to PUCCH mode 1-1 for both CSI mode 1 and 2. This facilitates further comparison between CSI mode 1 and 2. The adopted reporting structure is given in Table 2. Table 2 shows the reporting structure for PUCCH mode 1-1. The notation x+y (as in RI+WI, W1+W2 indicates the possibility for joint encoding. Similarly the notation x/y (as in RI/WI, W1/W2) indicates the possibility for joint encoding.

TABLE 2

|  | CSI mode 1 | CSI mode 2 |
|---|---|---|
| Report 1 | RI + W1 | RI |
| Report 2 | CQI, W2 | CQI, W1 + W2 |

From Table 2 it is apparent that in CSI mode 1 report 2 simply follows the Rel. 8 Precoding Matrix Indicator (PMI) principle where W2 is analogous to the Rel. 8 PMI. In CSI mode 2 report 1 carries only the Rel, 8 RI making codebook sub-sampling irrelevant. Codebook sub-sampling is needed for CSI mode 1 report 1 and CSI mode 2 report 2. This will be discussed below.

Figure 3:
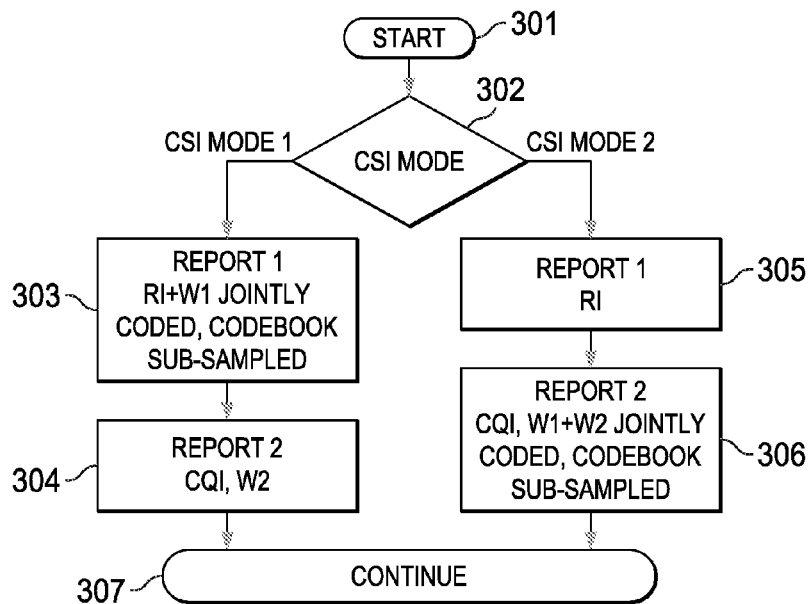
FIG. 3 illustrates the process of RI, CQI W1 and W2 reporting according to this invention.

FIG. 3 illustrates this process. FIG. 3 begins with start block 301. Test block 302 determines if CSI mode 1 or CSI mode 2 is selected. If CSI mode 1 is selected, then block 303 generates report 1. RI and W1 are jointly encoded. They are also codebook sub-sampled according to one of Tables 3 to 15 below. Block 304 generates report 2 with CQI and W2 separately encoded.

If CSI mode 2 is selected, then block 305 generates report 1. This includes the separately encoded RI. Block 306 generates report 2 with CQI, W1 and W2. W1 and W2 are jointly encoded with codebook sub-sampling according to one of Tables 16 to 19. FIG. 3 ends with continue block 306.

For CSI report on PUSCH, codebook sub-sampling may be performed on W2 as shown in Tables 21 to 25.

Codebook Sub-Sampling

Codebook sub-sampling is selected for the two scenarios mentioned above.

CSI mode 1 report 1 (RI+W1)

In this case, the total payload RI+W1 is kept within 5 bits to ensure that the effect of error propagation is not significant for any practical range of RI reporting interval. The following actions are performed to attain such goal when sub-sampling is performed on the codebook C1 for W1. First, joint encoding of RI and W1 follow the standard. This ensures efficient signaling of W1 with minimum overhead. Second, overlapping beams between two different W1 matrices can be skipped whenever appropriate as overlapping beam can be seen as an optimization feature. Third, since precoding gain is expected to be small for higher-rank transmission (rank>4), fixed precoding using only one W1 matrix may be appropriate.

Tables 3 to 15 show three exemplary W1 codebook sub-sampling schemes. These examples are ordered in increasing total number of hypotheses. It is possible to combine a part of one example with other parts from other examples. For example, for RI=1 to 4 example 1 may be used while for RI=5 to 8 example 3 may be used. While the total number of hypotheses differs, all these exemplary designs occupy a maximum of 5 bits for jointly coded RI and W1. Thus some additional encoding may be performed to reap the advantage of the design with the smallest number of hypotheses. For instance, example 1 can use an encoding technique to map 24 hypotheses onto $2^5=32$ available code points. Otherwise, it seems more attractive to choose example 3 as the 5-bit payload carries more precoding hypotheses.

Table 3 shows a first example of sub-sampling of codebook C1 with 5-bit RI+W1.

TABLE 3

| RI | Chosen W1 index for sub-sampling ($i_1$) | No. W1 hypotheses |
|---|---|---|
| 1 | 0, 2, 4, 6, 8, 10, 12, 14 (no overlap) | 8 |
| 2 | 0, 2, 4, 6, 8, 10, 12, 14 (no overlap) | 8 |
| 3 | 0, 2 (no overlap) | 2 |
| 4 | 0, 2 (no overlap) | 2 |
| 5 | 0 (fixed precoding) | 1 |
| 6 | 0 (fixed precoding) | 1 |
| 7 | 0 (fixed precoding) | 1 |
| 8 | 0 | 1 |
| Total no. hypotheses across ranks, required coding bits | | 24, 5 bits |

Table 4 shows a second example of sub-sampling of codebook C1 with 5-bit RI+W1.

TABLE 4

| RI | Chosen W1 index for sub-sampling ($i_1$) | No. W1 hypotheses |
|---|---|---|
| 1 | 0, 2, 4, 6, 8, 10, 12, 14 (no overlap) | 8 |
| 2 | 0, 2, 4, 6, 8, 10, 12, 14 (no overlap) | 8 |
| 3 | 0, 1, 2, 3 (all) | 4 |
| 4 | 0, 1, 2, 3 (all) | 4 |
| 5 | 0 (fixed precoding) | 1 |
| 6 | 0 (fixed precoding) | 1 |
| 7 | 0 (fixed precoding) | 1 |
| 8 | 0 | 1 |
| Total no. hypotheses across ranks, required coding bits | | 28, 5 bits |

Table 5 shows a third example of sub-sampling of codebook C1 with 5-bit RI+W1.

TABLE 5

| RI | Chosen W1 index for sub-sampling ($i_1$) | No. W1 hypotheses |
|---|---|---|
| 1 | 0, 2, 4, 6, 8, 10, 12, 14 (no overlap) | 8 |
| 2 | 0, 2, 4, 6, 8, 10, 12, 14 (no overlap) | 8 |
| 3 | 0, 1, 2, 3 (all) | 4 |
| 4 | 0, 1, 2, 3 (all) | 4 |
| 5 | 0, 1 (use 2 out of 4) | 2 |
| 6 | 0, 1 (use 2 out of 4) | 2 |
| 7 | 0, 1 (use 2 out of 4) | 2 |
| 8 | 0 | 1 |
| Total no. hypotheses across ranks, required coding bits | | 31, 5 bits |

Table 6 shows a fourth example of sub-sampling of codebook C1 with 5-bit RI+W1.

TABLE 6

| RI | Chosen W1 index for sub-sampling ($i_1$) | No. W1 hypotheses |
|---|---|---|
| 1 | 0, 2, 4, 6, 8, 10, 12, 14 (no overlap) | 8 |
| 2 | 0-15 | 16 |
| 3 | 0, 2 (no overlap) | 2 |
| 4 | 0, 2 (no overlap) | 2 |
| 5 | 0 (fixed precoding) | 1 |
| 6 | 0 (fixed precoding) | 1 |
| 7 | 0 (fixed precoding) | 1 |
| 8 | 0 | 1 |
| Total no. hypotheses across ranks, required coding bits | | 32, 5 bits |

Table 7 shows a fifth example of sub-sampling of codebook C1 with 5-bit RI+W1.

TABLE 7

| RI | Chosen W1 index for sub-sampling ($i_1$) | No. W1 hypotheses |
|---|---|---|
| 1 | 0-15 | 16 |
| 2 | 0, 2, 4, 6, 8, 10, 12, 14 (no overlap) | 8 |
| 3 | 0, 2 (no overlap) | 2 |
| 4 | 0, 2 (no overlap) | 2 |
| 5 | 0 (fixed precoding) | 1 |
| 6 | 0 (fixed precoding) | 1 |
| 7 | 0 (fixed precoding) | 1 |
| 8 | 0 | 1 |
| | Total no. hypotheses across ranks, required coding bits | 32, 5 bits |

As an alternative, it is possible for the RI/W1 payload to be UE-specific. Thus the RI/W1 payload varies as a function of the UE category, such as a maximum number of layers supported in downlink data transmission in PDSCH or number of UE receive antennas. For example, if a UE has only two receive antennas or can receive up to 2 layers in downlink data transmission, RI+W1 reporting is limited to RI=1 or RI=2. Hence in Tables 3-7 the payload of RI/W1 is determined by the total entries in RI=1 and RI=2. This is already supported in Rel. 8 where the RI bit width can be 1 or 2 bits based on UE category. Thus the payload of RI/W1 may be reduced to 4 bits or sub-sampling may not be performed for 2 Rx and 4 Rx UE with 5-bits RI/W1. Tables 8 to 14 show a number of exemplary sub-sampling cases.

Table 8 shows a sub-sampling of codebook C1 for 4-bit RI+W1 for a 2-layer capable UE (2 RX).

TABLE 8

| RI | Chosen W1 index for sub-sampling ($i_1$) | No. W1 hypotheses |
|---|---|---|
| 1 | 0, 2, 4, 6, 8, 10, 12, 14 (no overlap) | 8 |
| 2 | 0, 2, 4, 6, 8, 10, 12, 14 (no overlap) | 8 |
| | Total no. hypotheses across ranks, required coding bits | 16, 4 bits |

Table 9 shows sub-sampling of codebook C1 for 5-bit RI+W1 for a 2-layer capable UE (2 RX) with no sub-sampling.

TABLE 9

| RI | Chosen W1 index for sub-sampling ($i_1$) | No. W1 hypotheses |
|---|---|---|
| 1 | 0-15 | 16 |
| 2 | 0-15 | 16 |
| | Total no. hypotheses across ranks, required coding bits | 32, 5 bits |

Table 10 shows sub-sampling of codebook C1 for 5-bit RI+W1 for 2-layer capable UE (2 RX).

TABLE 10

| RI | Chosen W1 index for sub-sampling ($i_1$) | No. W1 hypotheses |
|---|---|---|
| 1 | 0, 2, 4, 6, 8, 10, 12, 14 (no overlap) | 8 |
| 2 | 0-15 | 16 |
| | Total no. hypotheses across ranks, required coding bits | 24, 5 bits |

Table 11 shows sub-sampling of codebook C1 for 5-bit RI+W1 for 2-layer capable UE (2 RX).

TABLE 11

| RI | Chosen W1 index for sub-sampling ($i_1$) | No. W1 hypotheses |
|---|---|---|
| 1 | 0-15 | 16 |
| 2 | 0, 2, 4, 6, 8, 10, 12, 14 (no overlap) | 8 |
| | Total no. hypotheses across ranks, required coding bits | 24, 5 bits |

Table 12 shows sub-sampling of codebook C1 5-bit RI+W1 for 4-layer capable UE (4 RX).

TABLE 12

| RI | Chosen W1 index for sub-sampling ($i_1$) | No. W1 hypotheses |
|---|---|---|
| 1 | 0, 2, 4, 6, 8, 10, 12, 14 (no overlap) | 8 |
| 2 | 0-15 | 16 |
| 3 | 0-3 | 4 |
| 4 | 0-3 | 4 |
| | Total no. hypotheses across ranks, required coding bits | 32, 5 bits |

Table 13 shows sub-sampling of codebook C1 with 5-bit RI+W1 for 4-layer capable UE (4 RX).

TABLE 13

| RI | Chosen W1 index for sub-sampling ($i_1$) | No. W1 hypotheses |
|---|---|---|
| 1 | 0-15 | 16 |
| 2 | 0, 2, 4, 6, 8, 10, 12, 14 (no overlap) | 8 |
| 3 | 0-3 | 4 |
| 4 | 0-3 | 4 |
| | Total no. hypotheses across ranks, required coding bits | 32, 5 bits |

Table 14 shows sub-sampling of codebook C for 5-bit RI+W1 for 4-layer capable UE (4 RX).

TABLE 14

| RI | Chosen W1 index for sub-sampling ($i_1$) | No. W1 hypotheses |
|---|---|---|
| 1 | 0, 2, 4, 6, 8, 10, 12, 14 (no overlap) | 8 |
| 2 | 0, 2, 4, 6, 8, 10, 12, 14 (no overlap) | 8 |
| 3 | 0-3 | 4 |
| 4 | 0-3 | 4 |
| | Total no. hypotheses across ranks, required coding bits | 24, 5 bits |

The maximum payload associated with RI depends on the UE capability of the maximum number of layers. The codebook sub-sampling scheme for a given rank or across the ranks can be designed so that it is not dependent on the UE capability in terms of the maximum number of layers. Table 15 shows an example. For ranks 5 to 7, it is possible to utilize only one 1 of 4 available W1 matrices if fixed precoding is desired. This nets to a total of 24 hypotheses. This can be done if reducing the total number of hypotheses from 27 to 24 is beneficial despite the same payload of 5 bits. Such a scenario is possible if the reserved (unused) hypotheses can be used for other purposes. In addition the use of some additional channel coding is applied on top of the (20,N) Reed-Muller code to improve error protection.

Table 15 shows an example codebook sub-sampling scheme for CSI mode 1 report 1.

TABLE 15

| R1 | Chosen W1 index for sub-sampling ($i_1$) | No. W1 hypotheses |
|---|---|---|
| 1 | 0, 2, 4, 6, 8, 10, 12, 14 (no overlapping beams) | 8 |
| 2 | 0, 2, 4, 6, 8, 10, 12, 14 (no overlapping beams) | 8 |
| 3 | 0, 2 (no overlapping beams) | 2 |
| 4 | 0, 2 (no overlapping beams) | 2 |
| 5 | 0, 1 (use 2 out of 4) | 2 |
| 6 | 0, 1 (use 2 out of 4) | 2 |
| 7 | 0, 1 (use 2 out of 4) | 2 |
| 8 | 0 | 1 |
| | Total no. W1 + RI hypotheses across ranks 1-2 (max. layers = 2), required coding bits | 16, 4 bits |
| | Total no. W1 + RI hypotheses across ranks 1-4 (max. layers = 4), required coding bits | 20, 4 bits |
| | Total no. W1 + RI hypotheses across ranks 1-8 (max. layers = 8), required coding bits | 27, 5 bits |

CSI Mode 2 Report 2 (CQI, W1+W2)

In this case, the total payload of CQI together with W1+W2 should not exceed 11 bits to ensure the same worst-case coverage as the Rel. 8 format 2/2a/2b. Hence, the following actions are performed to attain such goal when sub-sampling is performed on the codebook C1+C2 for W1+W2:

To maintain the maximum overhead of 11 bits:
RI=1: Since CQI occupies 4 bits, the payload for W1+W2 should not exceed 7 bits
RI<1: Since CQI occupies 7 bits, the payload for W1+W2 should not exceed 4 bits Joint encoding of W1 and W2 should be performed whenever possible: This ensures efficient signaling of W1+W2 with minimum overhead.

Overlapping beams between two different W1 matrices can be skipped whenever appropriate as overlapping beam can be seen as an optimization feature.

Since precoding gain is expected to be small for higher-rank transmission (rank>4), fixed precoding (using only one W1 matrix) should also be considered whenever appropriate.

Sub-sampling of C1 and C2 can also be performed jointly rather than separately.

Keeping the above principles in mind, three exemplary W1+W2 codebook sub-sampling schemes are given below in Tables 16 to 19.

Table 16 shows a first example of sub-sampling of codebook C1+C2.

FIG. 16

| RI | Chosen W1 + W2 index for sub-sampling | No. W1 + W2 hypotheses |
|---|---|---|
| 1 | W1: 0, 2, 4, 6, 8, 10, 12, 14 (no overlap) ($i_1$) W2: for each W1, choose only Y = e1 and e3 with all 4 possible co-phasing [note: this resembles (N, Nb) = (16, 1) design] ($i_2$ = 0-3, 8-11) | 8 × 8 = 64, 6 bits |
| 2 | W1: 0, 2, 4, 6, 8, 10, 12, 14 (no overlap) ($i_1$) W2: for each W1, choose only (Y1, Y2) = (e1, e1) with all 2 possible co-phasing [note: this resembles (N, Nb) = (8, 1) design] ($i_2$ = 0-1) | 8 × 2 = 18, 4 bits |
| 3 | W1: 0, 2 (no overlap) ($i_1$) W2: for each W1, choose only 8 out of 16 possible (Y1, Y2), e.g. the even indexed or the last 8 ($i_2$ = 0, 2, . . . 14 or 8-15) | 2 × 8 = 16, 4 bits |
| 4 | W1: 0, 2 (no overlap) ($i_1$) W2: all | 2 × 8 = 16 4 bits |
| 5 | W1: 0 (fixed precoding) ($i_1$) | 1, 0 bit |
| 6 | W1: 0 (fixed precoding) ($i_1$) | 1, 0 bit |
| 7 | W1: 0 (fixed precoding) ($i_1$) | 1, 0 bit |
| 8 | W1: 0 ($i_1$) | 1, 0 bit |

Table 17 shows a second example sub-sampling of codebook C1+C2.

TABLE 17

| RI | Chosen W1 + W2 index for sub-sampling | No. W1 + W2 hypotheses |
|---|---|---|
| 1 | W1: all ($i_1$) W2: for each W1, choose only Y = e1 with all 4 possible co-phasing [note: this resembles (N, Nb) = (16, 1) design] ($i_2$ = 0-3) | 16 × 4 = 64, 6 bits |
| 2 | W1: 0, 2, 4, 6, 8, 10, 12, 14 (no overlap) ($i_1$) W2: for each W1, choose only (Y1, Y2) = (e1, e1) with all 2 possible co-phasing [note: this resembles (N, Nb) = (8, 1) design] ($i_2$ = 0-1) | 8 × 2 = 18, 4 bits |
| 3 | W1: 0, 2 (no overlap) ($i_1$) W2: for each W1, choose only 8 out of 16 possible (Y1, Y2), e.g. the even indexed or the last 8 ($i_2$ = 0, 2, . . . 14 or 8-15) | 2 × 8 = 16, 4 bits |
| 4 | W1: 0, 2 (no overlap) ($i_1$) W2: all | 2 × 8 = 16, 4 bits |
| 5 | W1: 0 (fixed precoding) ($i_1$) | 1, 0 bit |
| 6 | W1: 0 (fixed precoding) ($i_1$) | 1, 0 bit |
| 7 | W1: 0 (fixed precoding) ($i_1$) | 1, 0 bit |
| 8 | W1: 0 ($i_1$) | 1, 0 bit |

Table 18 shows a third example of sub-sampling of codebook C1+C2.

TABLE 18

| RI | Chosen W1 + W2 index for sub-sampling | No. W1 + W2 hypotheses |
|---|---|---|
| 1 | W1: 0, 2, 4, 6, 8, 10, 12, 14 (no overlap) ($i_1$) W2: all [note: maximum refinement gain for frequency selective precoding] | 8 × 16 = 128, 7 bits |
| 2 | W1: 0, 2, 4, 6, 8, 10, 12, 14 (no overlap) ($i_1$) W2: for each W1, choose only (Y1, Y2) = (e1, e1) with all 2 | 8 × 2 = 16, 4 bits |

TABLE 18-continued

| RI | Chosen W1 + W2 index for sub-sampling | No. W1 + W2 hypotheses |
|---|---|---|
|  | possible co-phasing [note: this resembles (N, Nb) = (8, 1) design] ($i_2$ = 0-1) |  |
| 3 | W1: 0, 2 (no overlap) ($i_1$) W2: for each W1, choose only 8 out of 16 possible (Y1, Y2), e.g. the even indexed or the last 8 ($i_2$ = 0, 2, . . . 14 or 8-15) | 2 × 8 = 16, 4 bits |
| 4 | W1: 0, 2 (no overlap) ($i_1$) W2: all | 2 × 8 = 16, 4 bits |
| 5 | W1: 0 (fixed precoding) ($i_1$) | 1, 0 bit |
| 6 | W1: 0 (fixed precoding) ($i_1$) | 1, 0 bit |
| 7 | W1: 0 (fixed precoding) ($i_1$) | 1, 0 bit |
| 8 | W1: 0 ($i_1$) | 1, 0 bit |

Table 19 shows a fourth example of sub-sampling of codebook C1+C2.

TABLE 19

| RI | Chosen W1 + W2 index for sub-sampling | No. W1 + W2 hypotheses |
|---|---|---|
| 1 | W1: all ($i_1$) W2: for each W1, choose only Y = e1 and e2 with all 4 possible co-phasing [note: this resembles (N, Nb) = (32, 1) design] ($i_2$ = 0-7) | 16 × 8 = 128, 7 bits |
| 2 | W1: 0, 2, 4, 6, 8, 10, 12, 14 (no overlap) ($i_1$) W2: for each W1, choose only (Y1, Y2) = (e1, e1) with all 2 possible co-phasing [note: this resembles (N, Nb) = (8, 1) design] ($i_2$ = 0-1) | 8 × 2 = 18, 4 bits |
| 3 | W1: 0, 2 (no overlap) ($i_1$) W2: for each W1, choose only 8 out of 16 possible (Y1, Y2), e.g. the even indexed or the last 8 ($i_2$ = 0, 2, . . . 14 or 8-15) | 2 × 8 = 16, 4 bits |
| 4 | W1: 0, 2 (no overlap) ($i_1$) W2: all | 2 × 8 = 16, 4 bits |
| 5 | W1: 0 (fixed precoding) ($i_1$) | 1, 0 bit |
| 6 | W1: 0 (fixed precoding) ($i_1$) | 1, 0 bit |
| 7 | W1: 0 (fixed precoding) ($i_1$) | 1, 0 bit |
| 8 | W1: 0 ($i_1$) | 1, 0 bit |

For any of the above exemplary designs, it is possible to combine a part of one example with other part(s) from other examples. Furthermore, it is possible to use more than one (e.g. 2 or all 4) W1 matrices for ranks 5, 6 and 7 for any of the above examples in Tables 16 to 19.

Feedback Payload Analysis

Based on the above codebook sub-sampling designs, the payload associated with each CSI mode can be compared below.

Table 20 shows a payload comparison for PUCCH mode 1-1 (bits).

TABLE 20

| | CSI mode 1 | | CSI mode 2 | |
|---|---|---|---|---|
| RI | Report 1 | Report 2 | Report 1 | Report 2 |
| 1 | 5(**) | 8 | 3 | 10/11 |
| 2 | 5(**) | 11 | 3 | 11 |
| 3 | 5(**) | 11 | 3 | 11 |
| 4 | 5(**) | 10 | 3 | 11 |
| 5 | 5 | 7 | 3 | 7 to 9 (*) |
| 6 | 5 | 7 | 3 | 7 to 9 (*) |
| 7 | 5 | 7 | 3 | 7 to 9 (*) |
| 8 | 5 | 7 | 3 | 7 |

For entries marked with (*) the result depends on how many W1 precoding matrices are used for ranks 5, 6, and 7. Entries marked (**) may be reduced to 4 bits if RI/W1 payload is to be variable and UE-specific depending on the UE category, for example the number of UE receive antennas or the maximum number of layers.

Codebook Sub-Sampling for PUSCH

PUSCH feedback mode for 8 TX supports natural extension of Rel. 8 PUSCH reporting mode (1-2, 2-2, 3-1) under the double-codebook structure and considers Mode 3-2 with sub-band PMI+CQI for CQI accuracy enhancement in Rel. 10. Considering the potentially larger payload and the use of carrier aggregation, the feedback overhead is reduced via codebook sub-sampling even further especially for the modes with sub-band PMI such as mode 1-2 and 3-2. Since W1 is wideband, there is no need to apply codebook sub-sampling in this case as the overhead is small relative to the rests. Codebook sub-sampling is applied only to W2 in the context of PUSCH reporting modes 1-2 and 3-2.

Codebook sub-sampling may be more compelling for mode 3-2. This is because the sub-band W2 payload size is {4,4,4,3} bits for rank {1,2,3,4}, which is also comparable to the payload in Rel. 8 mode 1-2. On the other hand, mode 3-2 consists of both sub-band CQI and sub-band PMI.

For the standard 8 TX codebook, W2 codebook sub-sampling can be performed in different manners. The W1 codebook is not sub-sampled and all the possible W1 matrices are used. Some exemplary W2 codebook sub-sampling schemes for different sub-sampling size are given in Table 21. While this is not exhaustive, the schemes given in Table 21 are expected to perform well. Note the design in Table 21 satisfies a nested property, so that the 1-bit W2 codebook is a subset of 2-bit W2 codebook. Thus a 2-bit W2 codebook is a subset of the 3-bit W2 codebook.

Table 21 shows different W2 codebook sub-sampling schemes for PUSCH.

TABLE 21

| W2 sub-sampling size | W2 sub-sampled codebook | | | |
|---|---|---|---|---|
| | Rank 1 | Rank 2 | Rank 3 | Rank 4 |
| 1-bit | Y = e1 with only 2 out of 4 possible co-phasing (e.g. BPSK only +/−1) (Note this corresponds to i2 = 0, 2) | (Y1, Y2) = [e1, e1] with all 2 co-phasing (Note this corresponds to i2 = 0, 1) | Choose only 2 out of 16 possible (Y1, Y2), e.g. (e1, [e1 e5]) or ([e1 e5], e5) (Note this corresponds to i2 = 0, 2) | Y = [e1 e5] with all 2 co-phasing (Note this corresponds to i2 = 0, 1) |
| 2-bit | Y = e1 with all 4 co-phasing (Note this corresponds to i2 = 0, 1, 2, 3) | (Y1, Y2) = [e1, e1] or [e3, e3] with all 2 co-phasing (Note this corresponds to i2 = 0, 1, 4, 5) | Choose only 4 out of 16 possible (Y1, Y2), e.g. (e1, [e1 e5]), (e3, [e3 e7]), ([e1 e5], e5), or ([e3 e7], e7) | Y = [e1 e5] or [e3 e7] with all 2 co-phasing (Note this corresponds to i2 = 0, 1, 4, 5) |

TABLE 21-continued

| W2 sub-sampling size | W2 sub-sampled codebook | | | |
|---|---|---|---|---|
| | Rank 1 | Rank 2 | Rank 3 | Rank 4 |
| 3-bit | Y = e1 or e3 with all 4 co-phasing (Note this corresponds to i2 = 0-3 and 8-11) | (Y1, Y2) = [e1, e1] or [e2, e2], [e3, e3], or [e4, e4] with all 2 co-phasing (Note this corresponds to i2 = 0-7) | Choose only 8 out of 16 possible (Y1, Y2), e.g. the even indexed or the last 8 (Note this corresponds to i2 = 0, 2, ... 14, or i2 = 8-15) | No sub-sampling (full set) (Note this corresponds to i2 = 0, 2, 8, 10) |
| 4-bit | No sub-sampling (full set) | No sub-sampling (full set) | No sub-sampling (full set) | n/a |

For rank-2 with 3-bit sub-sampling, instead of choosing (Y1,Y2)=[e1,e1] or [e2,e2], [e3,e3], or [e4,e4], this invention chooses a N1 precoders from {[e1,e1], [e2, e2], [e3,e3], [e4, e4]} with 2-co-phasing and chooses a N2 precoders from {[e1 e2], [e2 e3], [e1 e4], [e2 e4]} with 2 co-phasing, where N1+N2=8. Achieves a good performance tradeoff between ULA and XPD antenna configurations. Example:

W2={[e1,e1], [e3, e3], [e1,e2], and [e1,e4]}, with 2-co-phasing;
W2={[e1,e1], [e3, e3], [e1,e2], and [e2,e4]}, with 2-co-phasing; and
W2={[e1,e1], [e3, e3], [e1,e4], and [e2,e4]}, with 2-co-phasing.

In these examples, it is possible to replace {[e1,e1], [e3, e3]} with {[e2,e2], [e4,e4]}. It is also possible to replace [e1,e2] with [e2,e3]. Similarly, for rank-2 with 2-bit sub-sampling, it is possible to replace [e3,e3] with [e1,e2], or [e2,e3], or [e1, e4] or [e2,e4].

For rank-3, sub-sampling can be designed slightly differently. A few examples are listed in Table 22. For a 3-bit rank-3 codebook, this invention chooses 8 out of 16 possible codebook entries. The nested property can be ensured where the 1-bit W2 is a subset of the 2-bit W2, while 1/2 bit W2 are subsets of 3-bits W2 codebook. This is satisfied in examples 1, 2 and 3.

Table 22 shows different W2 codebook sub-sampling schemes for PUSCH for Rank-3.

TABLE 22

| W2 sub-sampling size | Example 1 Rank 3 | Example 2 Rank 3 | Example 3 Rank 3 | Example 4 Rank 3 |
|---|---|---|---|---|
| 1-bit | Choose only 2 out of 16 possible (Y1, Y2), e.g. (e1, [e1 e5]) or ([e1 e5], e5) (Note this corresponds to i2 = 0, 2) | Choose only 2 out of 16 possible (Y1, Y2), e.g. (e1, [e1 e5]) or ([e1 e5], e1) (Note this corresponds to i2 = 0, 3) | Choose only 2 out of 16 possible (Y1, Y2), e.g. (e1, [e5 e5]) or ([e5 e5], e5) (Note this corresponds to i2 = 0, 2) | Choose only 2 out of 16 possible (Y1, Y2), e.g. (e1, [e5 e5]) or ([e5 e5], e1) (Note this corresponds to i2 = 0, 3) |
| 2-bit | Choose only 4 out of 16 possible (Y1, Y2), e.g. (e1, [e1 e5]), (e3, [e3 e7]), ([e1 e5], e5), or ([e3 e7], e7) (Note this corresponds to i2 = 0, 2, 8, 10) | Choose only 4 out of 16 possible (Y1, Y2), e.g. (e1, [e1 e5]), (e3, [e3 e7]), ([e1 e5], e1), or ([e7 e3], e3) (Note this corresponds to i2 = 0, 3, 8, 11) | Choose only 4 out of 16 possible (Y1, Y2), e.g. (e1, [e1 e5]), (e3, [e3 e7]), ([e5 e5], e5), or ([e3 e7], e7) (Note this corresponds to i2 = 0, 2, 8, 10) | Choose only 4 out of 16 possible (Y1, Y2), e.g. (e1, [e1 e5]), (e3, [e3 e7]), ([e5 e5], e1), or ([e7 e3], e3) (Note this corresponds to i2 = 0, 3, 8, 11) |
| 3-bit | Choose 8 out of 16 possible (Y1, Y2), e.g. even indexed entries from the codebook (Note this corresponds to i2 = 0, 1, 2, 3, 8, 9, 10, 11) | Choose 8 out of 16 possible (Y1, Y2), e.g. even indexed entries from the codebook (Note this corresponds to i2 = 0, 1, 2, 3, 8, 9, 10, 11) | Choose only 8 out of 16 possible (Y1, Y2), e.g. the even indexed (Note this corresponds to i2 = 0, 2, ... 14) | Choose only 8 out of 16 possible (Y1, Y2), e.g. the even indexed (Note this corresponds to i2 = 0, 2, ... 14) |
| 4-bit | No sub-sampling (full set) | No sub-sampling (full set) | No sub-sampling (full set) | No sub-sampling (full set) |

We further note the following. For rank 1 it is possible to sub-sample the W2 such that Y=[e1] with all 4 co-phasing are chosen. In this case the effective rank-1 codebook becomes [N, Nb]=[16,1] design with no sub-sampling for W1. The payload size for subband W2 is then reduced to 2 bits. For rank 3 it is also possible to sub-sample the W2 codebook such that every 4th of the 16 possible (Y1, Y2) are chosen. This results in the following W2 codebook. The payload size of subband W2 is then reduced to 2-bits.

$$W_2 \in C_2 = \left\{ \frac{1}{\sqrt{2}} \begin{bmatrix} Y_1 & Y_2 \\ Y_1 & -Y_2 \end{bmatrix} \right\}, (Y_1, Y_2) \in \left\{ \begin{array}{l} (e_1, [e_1\ e_5]) \\ (e_5, [e_1\ e_5]) \\ ([e_1\ e_5], e_5) \\ ([e_5\ e_1], e_1) \end{array} \right\}$$

For rank-4, it is possible to further sub-sample the W2 codebook such that only [e1 e5] and [e3 e7] are chosen for [Y1, Y2]. The payload size of subband W2 is then reduced to 2 bits.

$$W_2 \in C_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}, Y \in \{[e_1\ e_5], [e_3\ e_7]\}$$

Thus one may generate any sub-sampling scheme with a combination of the schemes given in Table 22, where the sub-sampling size for rank-n (n=1, ... 8) are different possibly. Some examples are given in Tables 23 to 25.

Table 23 is an example of combination with different sizes across different ranks

TABLE 23

| RI | Chosen W2 index for sub-sampling | No. W2 hypotheses (bits) |
|---|---|---|
| 1 | Y = e1 with all 4 possible co-phasing | W2 payload: log2(4) = 2 bits |
| 2 | Choose only (Y1, Y2) = (e1, e1) with all 2 possible co-phasing | W2 payload: log2(2) = 1 bit |
| 3 | Choose only 4 out of 16 possible (Y1, Y2), e.g. every 4th entry | W2 payload: log2(4) = 2 bits |
| 4 | [Y1 Y2] = [e1, e5] and [e3 e7] | W2 payload: log2(4) = 2 bits |
| 5 | All | 1, 0 bit |
| 6 | All | 1, 0 bit |
| 7 | All | 1, 0 bit |
| 8 | All | 1, 0 bit |

Table 23 is an example of combination with different sizes across different ranks.

TABLE 24

| RI | Chosen W2 index for sub-sampling | No. W2 hypotheses (bits) |
|---|---|---|
| 1 | Y = e1 and e3 with all 4 possible co-phasing | W2 payload: log2(8) = 3 bits |
| 2 | Choose only (Y1, Y2) = (e1, e1) with all 2 possible co-phasing | W2 payload: log2(2) = 1 bits |
| 3 | Choose only 8 out of 16 possible (Y1, Y2), e.g. the even indexed or the last 8 | W2 payload: log2(8) = 3 bits |
| 4 | All | 1, 0 bit |
| 5 | All | 1, 0 bit |
| 6 | All | 1, 0 bit |
| 7 | All | 1, 0 bit |
| 8 | All | 1, 0 bit |

Table 25 is an example of this combination with different sizes across different ranks.

TABLE 25

| RI | Chosen W2 index for sub-sampling | No. W2 hypotheses (bits) |
|---|---|---|
| 1 | Y = e1 and e3 with all 4 possible co-phasing | W2 payload: log2(8) = 3 bits |
| 2 | Choose only (Y1, Y2) = (e1, e1) or (e3, e3) with all 2 co-phasing | W2 payload: log2(4) = 2 bits |
| 3 | Choose only 4 out of 16 possible (Y1, Y2), e.g. every 4th entry | W2 payload: log2(4) = 2 bits |
| 4 | [Y1 Y2] = [e1, e5] and [e3 e7] | W2 payload: log2(4) = 2 bits |
| 5 | All | 1, 0 bit |
| 6 | All | 1, 0 bit |
| 7 | All | 1, 0 bit |
| 8 | All | 1, 0 bit |

The agreed standard 8 TX codebook can be written as shown below. The composite precoder W is derived from W=W1*W2. The following notation is used:

$e_n$ denotes a 4×1 selection vector with all zeros except for the n-th element with value 1; and $\bar{e}_n$ denotes an 8×1 selection vector with all zeros except for the n-th element with value 1.

Rank 1 and 2:

$$B = [b_0, b_1 \ldots b_{31}], [B]_{1+m,1+n} = e^{j\frac{2\pi mn}{32}}, m = 0, 1, 2, 3, n = 0, 1, \ldots, 31$$

$$X^{(k)} \in \{[b_{2k \bmod 32} b_{(2k+1) \bmod 32} b_{(2k+2) \bmod 32} b_{(2k+3) \bmod 32}]: k = 0, 1, \ldots, 15\}$$

$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, \ldots, W_1^{(15)}\}$$

Rank 1:

$$W_2 \in C_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\},$$

$$Y \in \{\bar{e}_1, \bar{e}_2, \bar{e}_3, \bar{e}_4\}$$

Rank 2:

$$W_2 \in C_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix} \frac{1}{\sqrt{2}}\begin{bmatrix} Y \\ -jY \end{bmatrix} \right\}$$

$(Y_1, Y_1) \in$ $\{(\bar{e}_1, \bar{e}_1), (\bar{e}_2, \bar{e}_2), (\bar{e}_3, \bar{e}_3), (\bar{e}_4, \bar{e}_4), (\bar{e}_1, \bar{e}_2), (\bar{e}_2, \bar{e}_3), (\bar{e}_1, \bar{e}_4), (\bar{e}_2, \bar{e}_4)\}$ Rank 3 and 4:

$$B = [b_0, b_1 \ldots b_{15}], [B]_{1+m,1+n} = e^{j\frac{2\pi mn}{16}}, m = 0, 1, 2, 3, n = 0, 1, \ldots, 15$$

$$X^{(k)} \in \{[b_{4k \bmod 16} b_{(4k+1) \bmod 16} \ldots b_{(4k+7) \bmod 16}]: k = 0, 1, 2, 3\}$$

$$W_1^{(k)} = \begin{bmatrix} X^{(k)} & 0 \\ 0 & X^{(k)} \end{bmatrix}, C_1 = \{W_1^{(0)}, W_1^{(1)}, W_1^{(2)}, \ldots, W_1^{(3)}\}$$

Rank 3:

$$W_2 \in C_2 = \left\{ \frac{1}{\sqrt{2}}\begin{bmatrix} Y_1 & Y_2 \\ Y_1 & -Y_2 \end{bmatrix} \right\},$$

$(Y_1, Y_2) \in$ $$\left\{ \begin{array}{l} (e_1, [e_1\ e_5]), (e_2, [e_2\ e_6]), (e_3, [e_3\ e_7]), (e_4, [e_4\ e_8]), \\ (e_5, [e_1\ e_5]), (e_6, [e_2\ e_6]), (e_7, [e_3\ e_7]), (e_8, [e_4\ e_8]), \\ ([e_1\ e_5], e_5), ([e_2\ e_6], e_6), ([e_3\ e_7], e_7), ([e_4\ e_8], e_8), \\ ([e_5\ e_1], e_1), ([e_6\ e_2], e_2), ([e_7\ e_3], e_3), ([e_8\ e_4], e_4), \end{array} \right\}$$

Rank 4:

$$W_2 \in C_2 = \left\{ \frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix} \right\},$$

$Y \in \{[e_1\ e_5], [e_2\ e_6], [e_3\ e_7], [e_4\ e_8]\}$

Rank 5 to 7:

$$X^{(k)} = \text{diag}\left\{1, e^{j\frac{\pi}{8}k}, e^{j\frac{\pi}{4}k}, e^{j\frac{3\pi}{8}k}\right\} \times \begin{bmatrix} 1 & 1 & 1 & 1 \\ 1 & j & -1 & -j \\ 1 & -1 & 1 & -1 \\ 1 & -j & -1 & j \end{bmatrix}$$

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\}$$

Rank 5:

$$W_2 = \frac{1}{\sqrt{2}} \begin{bmatrix} \bar{e}_1 & \bar{e}_1 & \bar{e}_2 & \bar{e}_2 & \bar{e}_3 \\ \bar{e}_1 & -\bar{e}_1 & \bar{e}_2 & -\bar{e}_2 & \bar{e}_3 \end{bmatrix}$$

Rank 6:

$$W_2 = \frac{1}{\sqrt{2}} \begin{bmatrix} \bar{e}_1 & \bar{e}_1 & \bar{e}_2 & \bar{e}_2 & \bar{e}_3 & \bar{e}_3 \\ \bar{e}_1 & -\bar{e}_1 & \bar{e}_2 & -\bar{e}_2 & \bar{e}_3 & -\bar{e}_3 \end{bmatrix}$$

Rank 7:

$$W_2 = \frac{1}{\sqrt{2}} \begin{bmatrix} \bar{e}_1 & \bar{e}_1 & \bar{e}_2 & \bar{e}_2 & \bar{e}_3 & \bar{e}_3 & \bar{e}_4 \\ \bar{e}_1 & -\bar{e}_1 & \bar{e}_2 & -\bar{e}_2 & \bar{e}_3 & -\bar{e}_3 & \bar{e}_4 \end{bmatrix}$$

Rank 8:

$$X^{(0)} = \begin{bmatrix} 1 & 1 & 1 & 1 \\ 1 & j & -1 & -j \\ 1 & -1 & 1 & -1 \\ 1 & -j & -1 & j \end{bmatrix}, W_1 = \begin{bmatrix} X^{(0)} & 0 \\ 0 & X^{(0)} \end{bmatrix}$$

Rank 8:

$$W_2 = \frac{1}{\sqrt{2}} \begin{bmatrix} \bar{e}_1 & \bar{e}_1 & \bar{e}_2 & \bar{e}_2 & \bar{e}_3 & \bar{e}_3 & \bar{e}_4 \\ \bar{e}_1 & -\bar{e}_1 & \bar{e}_2 & -\bar{e}_2 & \bar{e}_3 & -\bar{e}_3 & \bar{e}_4 \end{bmatrix}$$

Figure 4:
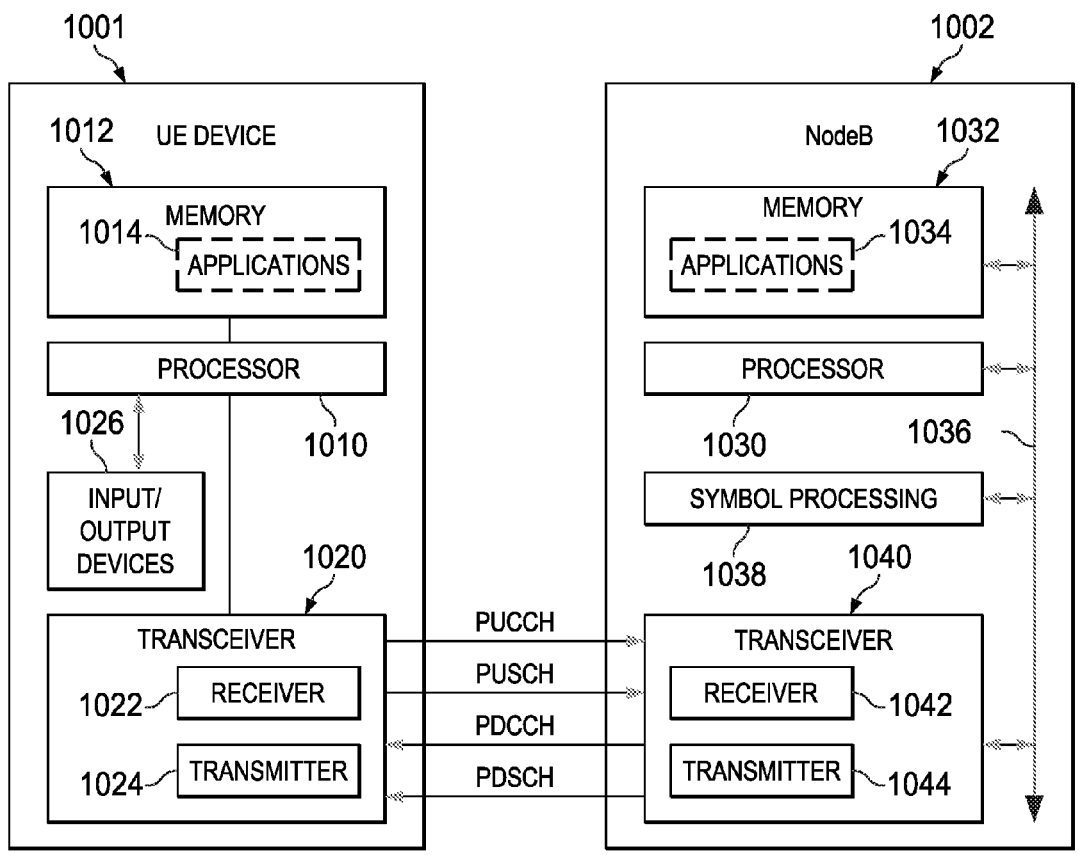
FIG. 4 is a block diagram illustrating internal details of a base station and a mobile user equipment in the network system of FIG. 1 suitable for implementing this invention.

FIG. 4 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VoIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VoIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method, comprising:
   transmitting via a Physical Uplink Control CHannel (PUCCH) a Channel State Information (CSI) feedback signal having:
      a first mode with a first report jointly coding Rank Indicator (RI) and a first precoding matrix (W1), and with a second report coding Channel Quality Indicator (CQI) and a second precoding matrix (W2), and
      a second mode with a first report coding Rank Indicator (RI), and with a second report coding Channel Quality Indicator (CQI) and jointly coding the first precoding matrix (W1) and the second precoding matrix (W2);
   wherein said jointly coding Rank Indicator (RI) and the first precoding matrix (W1) employs codebook sub-sampling;
   wherein said jointly coding the first precoding matrix (WI) and the second precoding matrix (W2) employs codebook sub-sampling; and
   wherein said jointly coding Rank Indicator (RI) and the first precoding matrix (W1) employs codebook sub-sampling into a maximum of 5 bits as follows:

| RI | Chosen W1 index for sub-sampling ($i_1$) |
|---|---|
| 1 | 0, 2, 4, 6, 8, 10, 12, 14 (no overlap) |
| 2 | 0, 2, 4, 6, 8, 10, 12, 14 (no overlap) |
| 3 | 0, 2 (no overlap) |
| 4 | 0, 2 (no overlap). |

2. The method of claim 1, wherein:
   sub-sampling of the first precoding matrix (W1) skips W1 matrices with overlapping beams.

3. A method, comprising:
   transmitting via a Physical Uplink Control CHannel (PUCCH) a Channel State Information (CSI) feedback signal having:
      a first mode with a first report jointly coding Rank Indicator (RI) and a first precoding matrix (W1), and with a second report coding Channel Quality Indicator (CQI) and a second precoding matrix (W2), and
      a second mode with a first report coding Rank Indicator (RI), and with a second report coding Channel Quality indicator (CQI) and jointly coding the first precoding matrix (W1) and the second precoding matrix (W2);
   wherein said jointly coding Rank Indicator (RI) and the first precoding matrix (W1) employs codebook sub-sampling;
   wherein said jointly coding the first precoding it matrix (W1) and the second precoding matrix (W2) employs codebook sub-sampling; and
   wherein said jointly coding Rank Indicator (RI) and the first precoding matrix (W1) employs codebook sub-sampling into a maximum of 5 hits as follows:

| RI | Chosen W1 index for sub-sampling ($i_1$) |
|---|---|
| 1 | 0, 2, 4, 6, 8, 10, 12, 14 (no overlap) |
| 2 | 0, 2, 4, 6, 8, 10, 12, 14 (no overlap) |
| 3 | 0, 1, 2, 3 (all) |
| 4 | 0, 1, 2, 3 (all). |

4. A method, comprising:
   transmitting via a Physical Uplink Control CHannel (PUCCH) a Channel State Information (CSI) feedback signal having:
      a first mode with a first report jointly coding Rank Indicator (RI) and a first precoding matrix (W1), and with a second report coding Channel Quality Indicator (CQI) and a second precoding matrix (W2), and
      a second mode with a first report coding Rank Indicator (RI), and with a second report coding Channel Quality Indicator (CQI) and jointly coding the first precoding matrix (W1) and the second precoding matrix (W2);
   wherein said jointly coding Rank Indicator (RI) and the first precoding matrix (W1) employs codebook sub-sampling;
   wherein said jointly coding the first precoding matrix (W1) and the second precoding matrix (W2) employs codebook sub-sampling; and
   wherein said jointly coding Rank Indicator (RI) and the first precoding matrix (W1) employs codebook sub-sampling into a maximum of 5 bits as follows:

| RI | Chosen W1 index for sub-sampling ($i_1$) |
|---|---|
| 1 | 0, 2, 4, 6, 8, 10, 12, 14 (no overlap) |
| 2 | 0, 2, 4, 6, 8, 10, 12, 14 (no overlap) |
| 3 | 0, 1, 2, 3 (all) |
| 4 | 0, 1, 2, 3 (all) |
| 5 | 0, 1 (use 2 out of 4) |
| 6 | 0, 1 (use 2 out of 4) |
| 7 | 0, 1 (use 2 out of 4) |
| 8 | 0. |

5. A method, comprising:
   transmitting via a Physical Uplink Control CHannel (PUCCH) a Channel State Information (CSI) feedback signal having:

a first mode with a first report jointly coding Rank Indicator (RI) and a first precoding matrix (W1), and with a second report coding Channel Quality Indicator (CQI) and a second precoding matrix (W2), and a second mode with a first report coding Rank Indicator (RI), and with a second report coding Channel Quality Indicator (CQI) and jointly coding the first precoding matrix (W1) and the second precoding matrix (W2);

wherein said jointly coding Rank Indicator (RI) and the first preceding matrix (W1) employs codebook sub-sampling;

wherein said jointly coding the first preceding matrix (W1) and the second preceding matrix (W2) employs codebook sub-sampling; and wherein said jointly coding Rank Indicator (RI) and the first preceding matrix (W1) employs codebook sub-sampling into a maximum of 5bits as follows:

| RI | Chosen W1 index for sub-sampling ($i_1$) |
|---|---|
| 1 | 0, 2, 4, 6, 8, 10, 12, 14 (no overlap) |
| 2 | 0-15 |
| 3 | 0, 2 (no overlap) |
| 4 | 0, 2 (no overlap). |

6. A method, comprising:

transmitting via a Physical Uplink Control CHannel (PUCCH) a Channel State Information (CSI) feedback signal having:

a first mode with a first report jointly coding Rank Indicator (RI) and a first precoding matrix (W1), and with a second report coding Channel Quality Indicator (CQI) and a second precoding matrix (W2), and a second mode with a first report coding Rank Indicator (RI), and with a second report coding Channel Quality Indicator (CQI) and jointly coding the first precoding matrix (W1) and the second precoding matrix (W2);

wherein said jointly coding Rank Indicator (RI) and the first preceding matrix (W1) employs codebook sub-sampling;

wherein said jointly coding the first precoding matrix (W1) and the second preceding matrix (W2) employs codebook sub-sampling; and wherein said jointly coding Rank Indicator (RI) and the first preceding matrix (W1) employs codebook sub-sampling into a maximum of 5 bits as follows:

| RI | Chosen W1 index for sub-sampling ($i_1$) |
|---|---|
| 1 | 0-15 |
| 2 | 0, 2, 4, 6, 8, 10, 12, 14 (no overlap) |
| 3 | 0, 2 (no overlap) |
| 4 | 0, 2 (no overlap). |

7. A method, comprising:

transmitting via a Physical Uplink Control CHannel (PUCCH) a Channel State Information (CSI) feedback signal having:

a first mode with a first report jointly coding Rank Indicator (RI) and a first precoding matrix (W1), and with a second report coding Channel Quality Indicator (CQI) and a second precoding matrix (W2), and a second mode with a first report coding Rank Indicator (RI), and with a second report coding Channel Quality Indicator (CQI) and jointly coding the first precoding matrix (W1) and the second precoding matrix (W2);

wherein said jointly coding Rank Indicator (RI) and the first precoding matrix (W1) employs codebook sub-sampling;

wherein said jointly coding the first precoding matrix (W1) and the second precoding matrix (W2) employs codebook sub-sampling; and wherein for a 2-layer capable user equipment said jointly coding Rank Indicator (RI) and the first precoding matrix (W1) employs codebook sub-sampling into 4bits as follows:

| RI | Chosen W1 index for sub-sampling ($i_1$) |
|---|---|
| 1 | 0, 2, 4, 6, 8, 10, 12, 14 (no overlap) |
| 2 | 0, 2, 4, 6, 8, 10, 12, 14 (no overlap). |

8. A method, comprising:

transmitting via a Physical Uplink Control CHannel (PUCCH) a Channel State Information (CSI) feedback signal having:

a first mode with a first report jointly coding Rank Indicator (RI) and a first precoding matrix (W1), and with a second report coding Channel Quality Indicator (CQI) and a second precoding matrix (W2), and a second mode with a first report coding Rank Indicator (RI), and with a second report coding Channel Quality Indicator (CQI) and jointly coding the first precoding matrix (W1) and the second precoding matrix (W2);

wherein said jointly coding Rank Indicator (RI) and the first precoding matrix (W1) employs codebook sub-sampling;

wherein said jointly coding the first precoding matrix (W1) and the second precoding matrix (W2) employs codebook sub-sampling; and wherein for a 2-layer capable user equipment said jointly coding Rank Indicator (RI) and the first precoding matrix (W1) employs codebook sub-sampling into 5 bits as follows:

| RI | Chosen W1 index for sub-sampling ($i_1$) |
|---|---|
| 1 | 0, 2, 4, 6, 8, 10, 12, 14 (no overlap) |
| 2 | 0-15. |

9. A method, comprising the steps of:

transmitting via a Physical Uplink Control CHannel (PUCCH) a Channel State Information (CSI) feedback signal having:

a first mode with a first report jointly coding Rank Indicator (RI) and a first preceding matrix (W1), and with a second report coding Channel Quality Indicator (CQI) and a second preceding matrix (W2), and a second mode with a first report coding Rank Indicator (RI), and with a second report coding Channel Quality Indicator (CQI) and jointly coding the first preceding matrix (WO and the second preceding matrix (W2);

wherein said jointly coding Rank Indicator (RI) and the first preceding matrix (W1) employs codebook sub-sampling;

wherein said jointly coding the first preceding matrix (W1) and the second preceding matrix (W2) employs codebook sub-sampling; and wherein for a 2-layer capable user equipment said jointly coding Rank Indicator (RI) and the first preceding matrix (W1) employs codebook sub-sampling into 5 bits as follows:

| RI | Chosen W1 index for sub-sampling ($i_1$) |
|---|---|
| 1 | 0-15 |
| 2 | 0, 2, 4, 6, 8, 10, 12, 14 (no overlap). |

10. A method, comprising:
transmitting via a Physical Uplink Control CHannel (PUCCH) a Channel State Information (CSI) feedback signal having:
 a first mode with a first report jointly coding Rank Indicator (RI) and a first precoding matrix (W1), and with a second report coding Channel Quality Indicator (CQD and a second precoding matrix (W2), and
 a second mode with a first report coding Rank Indicator (RI), and with a second report coding Channel Quality Indicator (COI) and jointly coding the first precoding matrix (W1) and the second precoding matrix (W2);
wherein said jointly coding Rank Indicator (RI) and the first precoding matrix (W1) employs codebook sub-sampling;
wherein said jointly coding the first precoding matrix (W1) and the second precoding matrix (W2) employs codebook sub-sampling; and
wherein for a 4-layer capable user equipment said jointly coding Rank Indicator (RI) and the first precoding matrix (W1) employs codebook sub-sampling into 5 hits as follows:

| RI | Chosen W1 index for sub-sampling ($i_1$) |
|---|---|
| 1 | 0, 2, 4, 6, 8, 10, 12, 14 (no overlap) |
| 2 | 0-15 |
| 3 | 0-3 |
| 4 | 0-3. |

11. A method, comprising:
transmitting via a Physical Uplink Control CHannel (PUCCH) a Channel State Information (CSI) feedback signal having:
 a first mode with a first report jointly coding Rank Indicator (RI) and a first precoding matrix (W1), and with a second report coding Channel Quality Indicator (CQI) and a second precoding matrix (W2), and
 a second mode with a first report coding Rank Indicator (RI), and with a second report coding Channel Quality Indicator (CQI) and jointly coding the first precoding matrix (W1) and the second precoding matrix (W2);
wherein said jointly coding Rank Indicator (RI) and the first precoding matrix (W1) employs codebook sub-sampling;
wherein said jointly coding the first precoding matrix (W1) and the second precoding matrix (W2) employs codebook sub-sampling; and
wherein for a 2-layer capable user equipment said jointly coding Rank Indicator (RI) and the first precoding matrix (W1) employs codebook sub-sampling into 5 bits as follows:

| RI | Chosen W1 index for sub-sampling ($i_1$) |
|---|---|
| 1 | 0-15 |
| 2 | 0, 2, 4, 6, 8, 10, 12, 14 (no overlap) |
| 3 | 0-3 |
| 4 | 0-3. |

12. A method, comprising:
transmitting via a Physical Uplink Control CHannel (PUCCH) a Channel State Information (CSI) feedback signal having:
 a first mode with a first report jointly coding Rank Indicator (RI) and a first precoding matrix (W1), and with a second report coding Channel Quality Indicator (CQI) and a second precoding matrix (W2), and
 a second mode with a first report coding Rank Indicator (RI), and with a second report coding Channel Quality Indicator (CQI) and jointly coding the first precoding matrix (W1) and the second precoding matrix (W2);
wherein said jointly coding Rank Indicator (RI) and the first precoding matrix (W1) employs codebook sub-sampling;
wherein said jointly coding the first precoding matrix (W1) and the second precoding matrix (W2) employs codebook sub-sampling; and
wherein for a 4-layer capable user equipment said jointly coding Rank indicator (RI) and the first precoding matrix (W1) employs codebook sub-sampling into 5 bits as follows:

| RI | Chosen W1 index for sub-sampling ($i_1$) |
|---|---|
| 1 | 0, 2, 4, 6, 8, 10, 12, 14 (no overlap) |
| 2 | 0, 2, 4, 6, 8, 10, 12, 14 (no overlap) |
| 3 | 0-3 |
| 4 | 0-3. |

13. A method, comprising:
transmitting via a Physical Uplink Control CHannel (PUCCH) a Channel State Information (CSI) feedback signal having:
 a first mode with a first report jointly coding Rank Indicator (RI) and a first precoding matrix (W1), and with a second report coding Channel Quality Indicator (COI) and a second precoding matrix (W2), and
 a second mode with a first report coding Rank Indicator (RI), and with a second report coding Channel Quality Indicator (COI) and jointly coding the first precoding matrix (W1) and the second precoding matrix (W2);
wherein said jointly coding Rank Indicator (RI) and the first precoding matrix (W1) employs codebook sub-sampling;
wherein said jointly coding the first precoding matrix (W1) and the second precoding matrix (W2employs codebook sub-sampling; and
wherein said jointly coding Rank Indicator (RI) and the first precoding matrix (W1) employs codebook sub-sampling selecting indices for the first precoding matrix (W1) as follows:

| RI | Chosen W1 index for sub-sampling |
|---|---|
| 1 | 0, 2, 4, 6, 8, 10, 12, 14 (no overlapping beams) |
| 2 | 0, 2, 4, 6, 8, 10, 12, 14 (no overlapping beams) |
| 3 | 0, 2 (no overlapping beams) |
| 4 | 0, 2 (no overlapping beams) |
| 5 | 0, 1 (use 2 out of 4) |
| 6 | 0, 1 (use 2 out of 4) |
| 7 | 0, 1 (use 2 out of 4) |
| 8 | 0. |

14. A method, comprising:
transmitting via a Physical Uplink Control CHannel (PUCCH) a Channel State Information (CSI) feedback signal having:

a first mode with a first report jointly coding Rank Indicator (RI) and a first precoding matrix (W1), and with a second report coding Channel Quality Indicator (CQI) and a second precoding matrix (W2), and a second mode with a first report coding Rank Indicator (RI), and with a second report coding Channel Quality Indicator (CQI) and jointly coding the first precoding matrix (W1) and the second precoding matrix (W2);

wherein said jointly coding Rank Indicator (RI) and the first preceding matrix (W1) employs codebook sub-sampling;

wherein said jointly coding the first precoding matrix (W1) and the second precoding matrix (W2) employs codebook sub-sampling; and wherein said jointly coding the first precoding matrix (W1) and the second preceding matrix (W2) employs codebook sub-sampling:

for rank equal one joint coding the first precoding matrix (W1) and the second precoding matrix (W2) employs 7 bits or less, and for rank greater than one joint coding the first preceding matrix (W1) and the second precoding matrix (W2) employs 4 bits or less.

15. A method, comprising:

transmitting via Physical Uplink Control CHannel (PUCCH) a Channel State Information (CSI) feedback signal having:

a first mode with a first report jointly coding Rank Indicator (RI) and a first precoding matrix (W1), and with a second report coding Channel Quality Indicator (CQI) and a second precoding matrix (W2), and a second mode with a first report coding Rank Indicator (RI), and with a second report coding Channel Quality Indicator (CQI) and jointly coding the first precoding matrix (W1) and the second precoding matrix (W2);

wherein said jointly coding Rank Indicator (RI) and the first preceding matrix (W1) employs codebook sub-sampling;

wherein said jointly coding the first precoding matrix (W1) and the second precoding matrix (W2) employs codebook sub-sampling; and wherein said jointly coding the first precoding matrix (W1) and the second precoding matrix (W2) employs codebook sub-sampling as follows:

| RI | Chosen W1 + W2 index for sub-sampling |
|---|---|
| 1 | W1: 0, 2, 4, 6, 8, 10, 12, 14 (no overlap) ($i_1$)<br>W2: for each W1, choose only Y = e1 and e3 with all 4 possible co-phasing [note: this resembles (N, Nb) = (16, 1) design]<br>($i_2$ = 0-3, 8-11) |
| 2 | W1: 0, 2, 4, 6, 8, 10, 12, 14 (no overlap) ($i_1$)<br>W2: for each W1, choose only (Y1, Y2) = (e1, e1) with all 2 possible co-phasing [note: this resembles (N, Nb) = (8, 1) design]<br>($i_2$ = 0-1) |
| 3 | W1: 0, 2 (no overlap) ($i_1$)<br>W2: for each W1, choose only 8 out of 16 possible (Y1, Y2), e.g. the even indexed or the last 8<br>($i_2$ = 0, 2, . . . 14 or 8-15) |
| 4 | W1: 0, 2 (no overlap) ($i_1$)<br>W2: all. |

16. A method of channel state information (CSI) feedback for communication between a base station (eNB) and a plurality of user equipment (UE), comprising the steps of:

each user equipment transmitting via Physical Uplink Control CHannel (PUCCH) a CSI feedback signal having:

a first mode with a first report jointly coding Rank Indicator (RI) and a first precoding matrix (W1), and with a second report coding Channel Quality Indicator (CQI) and a second precoding matrix (W2), and a second mode with a first report coding Rank Indicator (RI), and with a second report coding Channel Quality Indicator (CQI) and jointly coding the first precoding matrix (W1) and the second precoding matrix (W2);

wherein said jointly coding Rank Indicator (RI) and the first precoding matrix (W1) employs codebook sub-sampling; wherein said jointly coding the first precoding matrix (W1) and the second precoding matrix (W2) employs codebook sub-sampling; and wherein said jointly coding the first precoding matrix (W1) and the second preceding matrix (W2) employs codebook sub-sampling as follows:

| RI | Chosen W1 + W2 index for sub-sampling |
|---|---|
| 1 | W1: all ($i_1$)<br>W2: for each W1, choose only Y = e1 with all 4 possible co-phasing [note: this resembles (N, Nb) = (16, 1) design]<br>($i_2$ = 0-3) |
| 2 | W1: 0, 2, 4, 6, 8, 10, 12, 14 (no overlap) ($i_1$)<br>W2: for each W1, choose only (Y1, Y2) = (e1, e1) with all 2 possible co-phasing [note: this resembles (N, Nb) = (8, 1) design]<br>($i_2$ = 0-1) |
| 3 | W1: 0, 2 (no overlap) ($i_1$)<br>W2: for each W1, choose only 8 out of 16 possible (Y1, Y2), e.g. the even indexed or the last 8<br>($i_2$ = 0, 2, . . . 14 or 8-15) |
| 4 | W1: 0, 2 (no overlap) ($i_1$)<br>W2: all |
| 5 | W1: 0 (fixed precoding) ($i_1$) |
| 6 | W1: 0 (fixed precoding) ($i_1$) |
| 7 | W1: 0 (fixed precoding) ($i_1$) |
| 8 | W1: 0 ($i_1$). |

17. A method, comprising:

transmitting via a Physical Uplink Control CHannel (PUCCH) a Channel State Information (CSI) feedback signal having:

a first mode with a first report jointly coding Rank Indicator (RI) and a first precoding matrix (W1), and with a second report coding Channel Quality Indicator (CQI) and a second precoding matrix (W2), and a second mode with a first report coding Rank Indicator (RI), and with a second report coding Channel Quality Indicator (CQI) and jointly coding the first precoding matrix (W1) and the second precoding matrix (W2);

wherein said jointly coding Rank Indicator (RI) and the first precoding matrix (W1) employs codebook sub-sampling;

wherein said jointly coding the first precoding matrix (W1) and the second precoding matrix (W2) employs codebook sub-sampling; and wherein said jointly coding the first precoding matrix (W1) and the second precoding matrix (W2) employs codebook sub-sampling as follows:

| RI | Chosen W1 + W2 index for sub-sampling |
|---|---|
| 1 | W1: 0, 2, 4, 6, 8, 10, 12, 14 (no overlap) ($i_1$)<br>W2: all [note: maximum refinement gain for frequency selective precoding] |
| 2 | W1: 0, 2, 4, 6, 8, 10, 12, 14 (no overlap) ($i_1$)<br>W2: for each W1, choose only (Y1, Y2) = (e1, e1) with all 2 possible co-phasing [note: this resembles |

-continued

| RI | Chosen W1 + W2 index for sub-sampling |
|---|---|
|  | (N, Nb) = (8, 1) design]<br>($i_2$ = 0-1) |
| 3 | W1: 0, 2 (no overlap) ($i_1$)<br>W2: for each W1, choose only 8 out of 16 possible (Y1, Y2), e.g. the even indexed or the last 8<br>($i_2$ = 0, 2, . . . 14 or 8-15) |
| 4 | W1: 0, 2 (no overlap) ($i_1$)<br>W2: all. |

18. A method, comprising:
transmitting via a Physical Uplink Control CHannel (PUCCH) a Channel State Information (CSI) feedback signal having:
  a first mode with a first report jointly coding Rank Indicator (RI) and a first precoding matrix (W1), and with a second report coding Channel Quality Indicator (CQI) and a second precoding matrix (W2), and
  a second mode with a first report coding Rank Indicator (RI), and with a second report coding Channel Quality Indicator (CQI) and jointly coding the first precoding matrix (W1) and the second precoding matrix (W2);
wherein said jointly coding Rank Indicator (RI) and the first precoding matrix (W1) employs codebook sub-sampling;
wherein said jointly coding the first precoding matrix (W1) and the second precoding matrix (W2) employs codebook sub-sampling; and
wherein said jointly coding the first precoding matrix (W1) and the second precoding matrix (W2) employs codebook sub-sampling as follows:

| RI | Chosen W1 + W2 index for sub-sampling |
|---|---|
| 1 | W1: all ($i_1$)<br>W2: for each W1, choose only Y = e1 and e2 with all 4 possible co-phasing [note: this resembles (N, Nb) = (32, 1) design]<br>($i_2$ = 0-7) |
| 2 | W1: 0, 2, 4, 6, 8, 10, 12, 14 (no overlap) ($i_1$)<br>W2: for each W1, choose only (Y1, Y2) = (e1, e1) with all 2 possible co-phasing [note: this resembles (N, Nb) = (8, 1) design]<br>($i_2$ = 0-1) |
| 3 | W1: 0, 2 (no overlap) ($i_1$)<br>W2: for each W1, choose only 8 out of 16 possible (Y1, Y2), e.g. the even indexed or the last 8<br>($i_2$ = 0, 2, . . . 14 or 8-15) |
| 4 | W1: 0, 2 (no overlap) ($i_1$)<br>W2: all |
| 5 | W1: 0 (fixed precoding) ($i_1$) |
| 6 | W1: 0 (fixed precoding) ($i_1$) |
| 7 | W1: 0 (fixed precoding) ($i_1$) |
| 8 | W1: 0 ($i_1$). |

19. A method, comprising:
reporting via a Physical Uplink Shared Channel (PUSCH) a Channel State Information (CSI) feedback signal including a rank indicator (RI) and at least one of the set including a channel quality indicator (CQI), a first precoding matrix (W1) and a second precoding matrix (W2);
wherein said reporting the second precoding matrix (W2) employs codebook sub-sampling; and
wherein said reporting the second precoding matrix (W2) employs codebook sub-sampling as follows:

| W2 sub-sampling size | W2 sub-sampled codebook | | | |
|---|---|---|---|---|
|  | Rank 1 | Rank 2 | Rank 3 | Rank 4 |
| 1-bit | Y = e1 with only 2 out of 4 possible co-phasing (e.g. BPSK only +/−1) (Note this corresponds to i2 = 0, 2) | (Y1, Y2) = (e1, e1] with all 2 co-phasing (Note this corresponds to i2 = 0, 1) | Choose only 2 out of 16 possible (Y1, Y2), e.g. (e1, [e1 e5]) or([e1 e5], e5) (Note this corresponds to i2 = 0, 2) | Y = [e1 e5] with all 2 cophasing (Note this corresponds to i2 = 0, 1) |
| 2-bit | Y = e1 with all 4 co-phasing (Note this corresponds to i2 = 0, 1, 2, 3) | (Y1, Y2) = (e1, e1] or (e3, e3] with all 2 co-phasing (Note this corresponds to i2 = 0, 1, 4, 5) | Choose only 4 out of 16 possible (Y1, Y2), e.g. (e1, [e1 e5]), (e3, [e3 e7]), ([e1 e5], e5), or ([e3 e7], e7) (Note this corresponds to i2 = 0, 2, 8, 10) | Y = [e1 e5] or [e3 e7] with all 2 co-phasing (Note this corresponds to i2 = 0, 1, 4, 5) |
| 3-bit | Y = e1 or e3 with all 4 co-phasing (Note this corresponds to i2 = 0-3 and 8-11) | (Y1, Y2) = (e1, e1] or (e2, e2], (e3, e3], or (e4, e4] with all 2 co-phasing (Note this corresponds to i2 = 0-7) | Choose only 8 out of 16 possible (Y1, Y2), e.g. the even indexed or the last 8 (Note this corresponds to i2 = 0, 2, . . . 14, or i2 = 8-15) | No sub-sampling (full set) |

-continued

| W2 sub-sampling size | W2 sub-sampled codebook | | | |
|---|---|---|---|---|
| | Rank 1 | Rank 2 | Rank 3 | Rank 4 |
| 4-bit | No sub-sampling (full set) | No sub-sampling (full set) | No sub-sampling (full set). | n/a |

20. A method, comprising:
reporting via a Physical Uplink Shared Channel (PUSCH) a Channel State Information (CSI) feedback signal including a rank indicator (RI) and at least one of the set including a channel quality indicator (CQI), a first precoding matrix (W1) and a second precoding matrix (W2);
wherein said reporting the second precoding matrix (W2) employs codebook sub-sampling; and
wherein said reporting the second preceding matrix (W2) employs codebook sub-sampling as follows:

| W2 sub-sampling size | Example 1 Rank 3 | Example 2 Rank 3 | Example 3 Rank 3 | Example 4 Rank 3 |
|---|---|---|---|---|
| 1-bit | Choose only 2 out of 16 possible (Y1, Y2), e.g. (e1, [e1 e5]) or([e1 e5], e5) (Note this corresponds to i2 = 0, 2) | Choose only 2 out of 16 possible (Y1, Y2), e.g. (e1, [e1 e5]) or([e5 e1], e1) (Note this corresponds to i2 = 0, 3) | Choose only 2 out of 16 possible (Y1, Y2), e.g. (e1, [e1 e5]) or([e1 e5], e5) (Note this corresponds to i2 = 0, 2) | Choose only 2 out of 16 possible (Y1, Y2), e.g. (e1, [e1 e5]) or([e5 e1], e1) (Note this corresponds to i2 = 0, 3) |
| 2-bit | Choose only 4 out of 16 possible (Y1, Y2), e.g. (e1, [e1 e5]), (e3, [e3 e7]), ([e1 e5], e5), or ([e3 e7], e7) (Note this corresponds to i2 = 0, 2, 8, 10) | Choose only 4 out of 16 possible (Y1, Y2), e.g. (e1, [e1 e5]), (e3, [e3 e7]), ([e5 e1], e1), or ([e7 e3], e3) (Note this corresponds to i2 = 0, 3, 8, 11) | Choose only 4 out of 16 possible (Y1, Y2), e.g. (e1, [e1 e5]), (e3, [e3 e7]), ([e1 e5], e5), or ([e3 e7], e7) (Note this corresponds to i2 = 0, 2, 8, 10) | Choose only 4 out of 16 possible (Y1, Y2), e.g. (e1, [e1 e5]), (e3, [e3 e7]), ([e5 e1], e1), or ([e7 e3], e3) (Note this corresponds to i2 = 0, 3, 8, 11) |
| 3-bit | Choose 8 out of 16 possible (Y1, Y2), e.g. even indexed entries from the codebook (Note this corresponds to i2 = 0, 1, 2, 3, 8, 9, 10, 11) | Choose 8 out of 16 possible (Y1, Y2), e.g. even indexed entries from the codebook (Note this corresponds to i2 = 0, 1, 2, 3, 8, 9, 10, 11) | Choose only 8 out of 16 possible (Y1, Y2), e.g. the even indexed (Note this corresponds to i2 = 0, 2, . . . 14) | Choose only 8 out of 16 possible (Y1, Y2), e.g. the even indexed (Note this corresponds to i2 = 0, 2, . . . 14) |
| 4-bit | No sub-sampling (full set) | No sub-sampling (full set) | No sub-sampling (full set) | No sub-sampling (full set). |

21. A method, comprising:
reporting via a Physical Uplink Shared Channel (PUSCH) a Channel State Information (CSI) feedback signal including a rank indicator (RI) and at least one of the set including a channel quality indicator (CQI), a first precoding matrix (W1) and a second precoding matrix (W2);
wherein said reporting the second preceding matrix (W2) employs codebook sub-sampling; and wherein said reporting the second precoding matrix (W2) employs codebook sub-sampling as follows:

| RI | Chosen W2 index for sub-sampling |
|---|---|
| 1 | Y = e1 with all 4 possible co-phasing |
| 2 | Choose only (Y1, Y2) = (e1, e1) with all 2 possible co-phasing |
| 3 | Choose only 4 out of 16 possible (Y1, Y2), e.g. every 4th entry |

-continued

| RI | Chosen W2 index for sub-sampling |
|---|---|
| 4 | [Y1 Y2] = [e1, e5] and [e3 e7] |
| 5 | All |
| 6 | All |
| 7 | All |
| 8 | All. |

22. A method, comprising:

reporting via a Physical Uplink Shared Channel (PUSCH) a Channel State Information (CSI) feedback signal including a rank indicator (RI) and at least one of the set including a channel quality indicator (CQI), a first precoding matrix (W1) and a second precoding matrix (W2);

wherein said reporting the second precoding matrix (W2) employs codebook sub-sampling; and wherein said reporting the second precoding matrix (W2) employs codebook sub-sampling as follows:

| RI | Chosen W2 index for sub-sampling |
|---|---|
| 1 | Y = e1 and e3 with all 4 possible co-phasing |
| 2 | Choose only (Y1, Y2) = (e1, e1) with all 2 possible co-phasing |
| 3 | Choose only 8 out of 16 possible (Y1, Y2), e.g. the even indexed or the last 8 |
| 4 | All |
| 5 | All |
| 6 | All |
| 7 | All |
| 8 | All. |

23. A method, comprising:

reporting via a Physical Uplink Shared Channel (PUSCH) a Channel State Information (CSI) feedback signal including a rank indicator (RI) and at least one of the set including a channel quality indicator (COD, a first preceding matrix (W1) and a second preceding matrix (W2);

wherein said reporting the second precoding matrix (W2) employs codebook sub-sampling; and wherein said reporting the second precoding matrix (W2) employs codebook sub-sampling as follows:

| RI | Chosen W2 index for sub-sampling |
|---|---|
| 1 | Y = e1 and e3 with all 4 possible co-phasing |
| 2 | Choose only (Y1, Y2) = (e1, e1) or (e3, e3) with all 2 co-phasing |
| 3 | Choose only 4 out of 16 possible (Y1, Y2), e.g. every 4th entry |
| 4 | [Y1 Y2] = [e1, e5] and [e3 e7] |
| 5 | All |
| 6 | All |
| 7 | All |
| 8 | All. |

\* \* \* \* \*